G. Q. RILEY.
HEATING SYSTEM.
APPLICATION FILED MAR. 25, 1915.
1,245,028.
Patented Oct. 30, 1917.
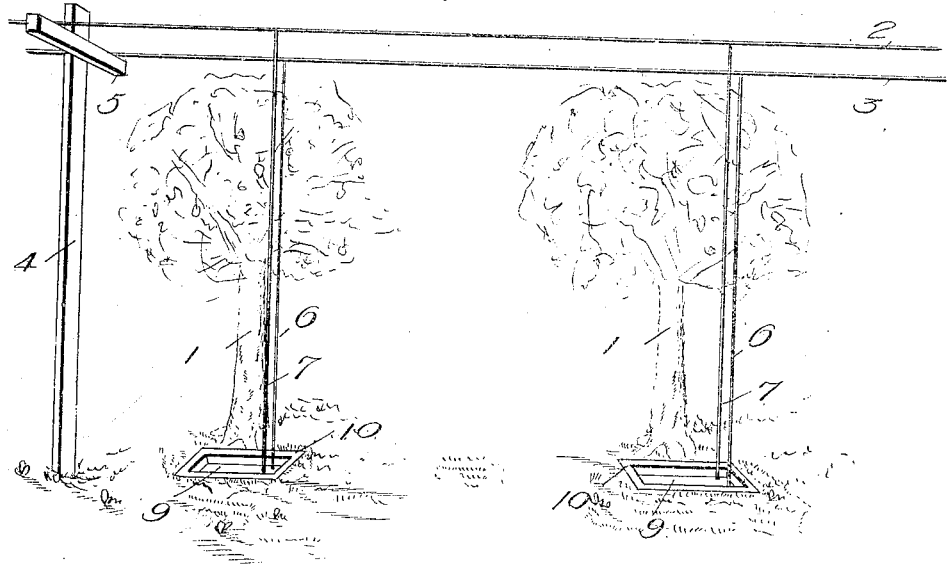
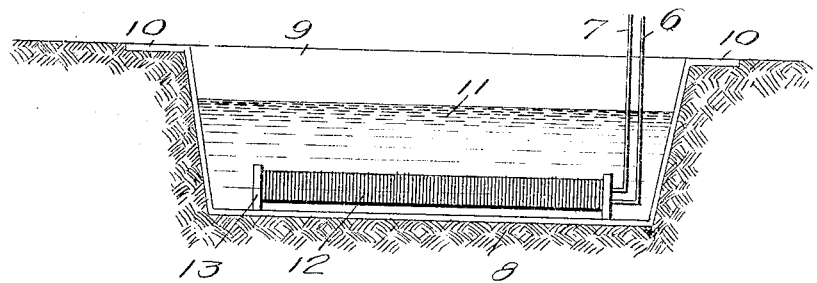
WITNESSES
INVENTOR
GEORGE Q. RILEY,
ATTORNEYS

UNITED STATES PATENT OFFICE.

GEORGE Q. RILEY, OF CORONA, CALIFORNIA.

HEATING SYSTEM.

1,245,028.  Specification of Letters Patent.  Patented Oct. 30, 1917.

Application filed March 25, 1915. Serial No. 16,872.

*To all whom it may concern:*

Be it known that I, GEORGE Q. RILEY, a citizen of the United States, and a resident of Corona, in the county of Riverside and State of California, have invented a new and useful Improvement in Heating Systems, of which the following is a specification.

My invention is an improvement in heating systems for orchards and the like, for preventing injury to the trees from frost and the like, wherein the system is a permanent arrangement having means adjacent to each tree for raising the temperature of the air about the tree above the point where the tree would be injured, the heat being provided by an electric current, thus permitting the system to be controlled at a distance.

In the drawings:—

Figure 1 is a diagrammatic view of a portion of the heating system, and

Fig. 2 is a longitudinal vertical section through one of the heaters.

The present embodiment of the invention is shown in connection with trees 1 and a heating medium to be later described, is provided for each tree. A pair of conducting wires 2 and 3 is strung through the orchard at desired intervals and preferably in parallel lines, the lead wires 2 and 3 being supported in any suitable manner, as for instance by the poles 4, having the cross arms 5 to which the conducting wires are connected, the wires being insulated from the cross arms.

It will be understood that as many pairs of wires 2 and 3 are used as may be desired, and adjacent to each tree, if necessary, a heater is arranged, the heater being supplied with current by means of branch wires 6 and 7 from the lead wires 2 and 3. The branch wires 6 and 7 drop downwardly from the lead wires, and the lower ends of the said wires 6 and 7 are connected with the heater.

Adjacent to each tree an excavation 8 is made in the ground, the excavation being of suitable size, and each excavation is lined with water tight lining. In the present instance an open pan or vessel 9 is seated in the excavation, each pan or vessel having a marginal flange 10 at the upper edge of its sides and ends, the said flanges having their upper faces flush with the surface of the ground.

Each of the pans 9 is adapted to contain water, as indicated at 11, the water filling about two-thirds of the space in the pan. An electric heater is arranged in each pan, each heater consisting of a coil 12 of resistance wire, mounted on a suitable support 13. The branch wires 6 and 7 at each heater are connected with the terminals of the coil 12, and a suitable switch may be provided at a central point, for admitting the electric current to the lead wires 2 and 3. The heaters 12 are arranged in parallel as shown, so that should for any reason one of the heaters be put out of commission it will not affect the other heaters.

In operation when the temperature falls below a certain predetermined point the switch is turned to admit the electric current to the lead wires 2 and 3. The current passing through the resistance wire 12 of the heaters will heat the said wire, thus heating the water 11 in the pan 9, and this heated water will heat the air directly above the pan. The pans are placed as near to the trees as possible, and the heated air and steam rising from the pan will pass upwardly through the foliage of the tree, raising the temperature of the air to a degree such that trees will not be injured. The current passing through the heater and the heaters themselves is such as to provide the proper amount of heat, and by the use of rheostats of well known construction, a greater or less degree of electric current may be passed through the heaters in accordance with the temperature.

As is known, fog or mist passing through the foliage of a tree acts to protect the same from the action of low temperature, and it will be obvious that the mist formed by the heating of the water will partially condense almost at once because of the low temperature, thus providing not only heated air but a mist or fog for coöperating with the heated air.

I claim:—

Means for protecting orchards, the same consisting of a plurality of open top water receiving containers disposed in excavations in the ground throughout the territory to be protected, the top of the containers being on a level with the surface of the ground to receive surface drainage, electric heaters disposed in said containers for vaporizing the water thereof to produce a protective mist or fog, main lead wires for supplying electric fluid, and branch wires connecting the electric heaters in parallel with the main leads.

GEORGE Q. RILEY.

Witnesses:
JNO. P. KEY,
H. M. KEY.